Dec. 15, 1959   G. W. BANKS   2,917,271
HIGH PRESSURE METERING VALVE
Filed Aug. 24, 1954   2 Sheets-Sheet 1
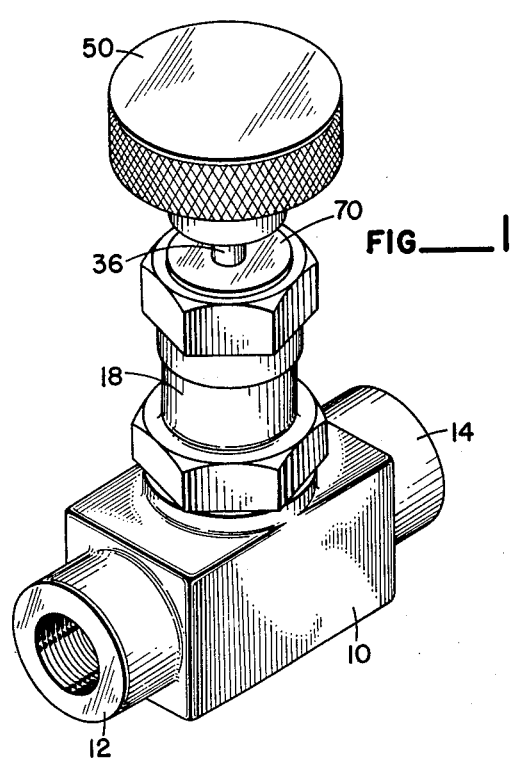
FIG—1
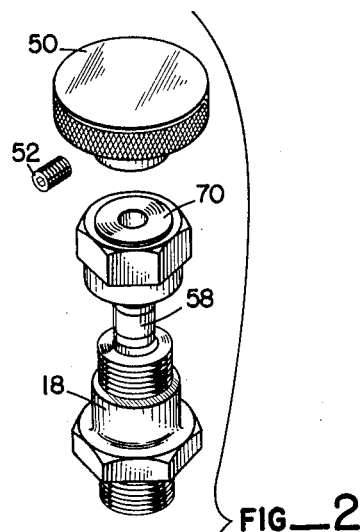
FIG—2
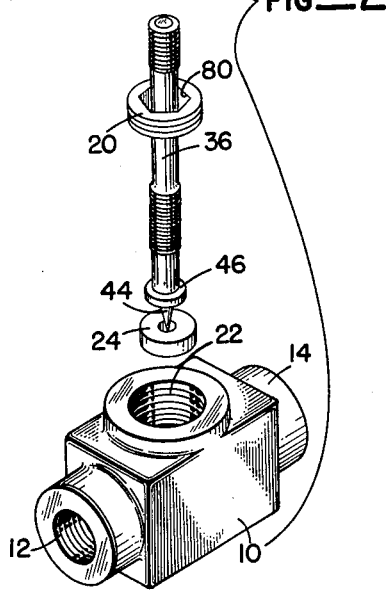
FIG—3
GEORGE W. BANKS
*INVENTOR.*
BY *Smitt + Tuck*

Dec. 15, 1959    G. W. BANKS    2,917,271
HIGH PRESSURE METERING VALVE
Filed Aug. 24, 1954    2 Sheets-Sheet 2

GEORGE W. BANKS
*INVENTOR.*

BY *Smith & Tuck*

United States Patent Office 2,917,271
Patented Dec. 15, 1959

2,917,271

HIGH PRESSURE METERING VALVE

George W. Banks, Seattle, Wash.

Application August 24, 1954, Serial No. 451,916

5 Claims. (Cl. 251—122)

This present invention relates to the general art of high pressure valves for the control of fluids under pressure. More particularly, this invention relates to metering valves where it is desirable to have complete control over the high pressure fluids so that the amount fed into a machine or into tested equipment, such as manometers, can be controlled very gradually so that small differences in the admitted fluids can be readily achieved. This basic unit is in effect a metering type of needle valve wherein the tapered pin seats in a slightly deformable plastic seat. Means are further provided adjacent the metering pin so that a relatively large flat surface engages the flat surface of the plastic seat to the end that even though the operator places tremendous pressure on the valve in closing the same, pressure is absorbed by the relatively large flat surfaces and no damage can be done to the accurately proportioned form of the valving members. Means are further provided to insure the easy turning operation of the metering pin even though the range of pressures which a valve of this type is designed to handle may vary from 5 to 2500 pounds per square inch. There are many needs in industry for valving arrangements which will permit the complete control over a high pressure fluid flow. This same condition is present in the operation of test equipment especially that which embodies a plurality of manometers, which in themselves are fragile instruments that can be easily destroyed by a sudden surge of excess pressures. A practical solution of this problem therefore is a valve mechanism which will permit a free turning valve so that the operator with his thumb and finger can actually make variations in the adjusted position of the valve, and which valve has its parts so constructed and arranged that even in an over-torque condition, where excess effort has been applied to the valve, the valve mechanism itself cannot be injured and thus disrupt delicate machines or test equipment. It is also very desirable that a valve of this type be constructed in a manner where extreme tolerances in manufacture are not required to the end that a small amount of wear will not make them inoperative and cause their replacement; and further the lack of necessity for extreme tolerances in manufacture enables the production of valves of this order at a very reasonable cost.

At the present time the conventional metering valve is very easily damaged due to its characteristics and design. The long gradual taper of the metering pin exerts such a great pressure on the female seat whenever the valve is overtorqued that the valve soon develops leaks. Many attempts have been made to overcome this difficulty. However, due to the extreme stress to which these seats are exposed whenever the valve is over-torqued, the valve is eventually ruined. It is quite normal for one to overtighten a valve. This is especially true when one is working with a network of valves, where if any one of them leaks slightly, it will ruin the test or the balance or the adjustment of the equipment. My new metering valve is believed to completely overcome all these troubles. It maintains perfect pressure control whether the pressure is at 5 pounds per square inch or 2500 pounds per square inch and it retains its control at any desired flow. The operation of the valve is smooth and effortless, a characteristic which allows one to pre-determine the desired flow by feel of the valve alone.

The principal object of my invention therefore is to provide a positive sealing, metering valve in which the valving members cannot be damaged by over-torquing of the control shaft.

A further object of my invention is to provide a metering valve arrangement wherein a metal metering pin engages a seat formed of slightly deformable plastic material having a pressure receiving upper surface adapted to accept the pressure of a pressure ring secured to the operating shaft immediately above the metering point.

A further object of my invention is to provide a metering valve capable of controlling fluid at very high pressures but wherein the design of the various parts which form the seating element is such that it is not necessary to have these parts machined to very exacting tolerances.

A further object of my invention is to provide an operating spindle or shaft in a metering valve arranged with a packing clamp which will hold the high pressures present without binding the shaft to the end that the valve settings may be made easily at all points and under a wide range of pressures.

A further object of my invention is to provide a degree of self-centering on the part of the metering point to the end that accurate seating can be achieved without the necessity of the accurate machining which is present when the metering point is rigidly positioned.

A further object of this invention is to provide a construction for a metering valve for use with high pressures but in which the manufacturing tolerances are similar to those of inexpensive valves to the end that my valve may be supplied at a reasonable cost to the user.

Further objects, advantages and capabilities will be apparent from the description and disclosure in the drawings, or may be comprehended or are inherent in the device.

In the drawings:

Figure 1 is a perspective view illustrating a typical valve made after the teachings of the present invention;

Figure 2 is an exploded perspective view of the same;

Figure 3 is a typical cross-sectional view taken through the valve stem and the fluid pipe-receiving bosses;

Figure 4:
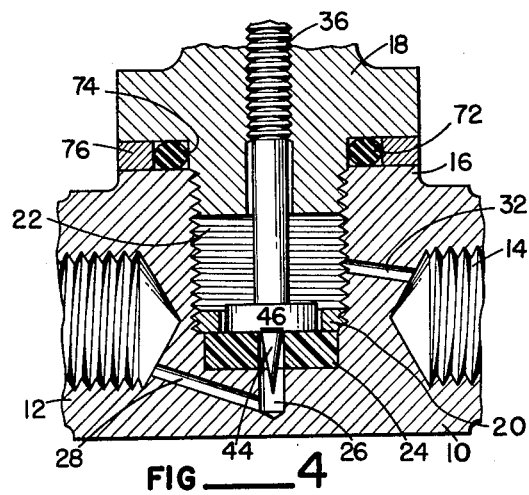
Figures 4, 5 and 6 are vertical sectional views illustrating three stages in the operating positions of my valve.

Referring more particularly to the disclosure in the drawings, the numeral 10 designates the valve body, generally, which is normally made of metal having the desired physical properties. At its opposite ends, body 10 is provided with threaded bosses 12 and 14 to which the pressure lines are secured. On its upper surface, a single boss 16 is provided. This boss is axially threaded to receive the screwed in valve stem guide member 18 and the valve disc seating and positioning ring 20. The third or normally vertical bore 22 is further counterbored to provide a seat for the valve disc 24. A second counterbore, 26, of reduced diameter, is provided, so as to connect the sloping fluid passageway 28 to the valving bore 30 of disc 24. The second communicating passageway is provided at 32 in order to connect bore 22 with the fluid line normally secured to boss 14.

Valve stem 36 is coaxially disposed with respect to bore 30 in the disc valve by means of the valve stem guide 18. Valve stem 36 is threaded intermediate its ends as at 38 so as to operably engage the threaded interior bore 40 of the valve stem guide member 18. At its lower end the valve stem 36 has a reduced diameter portion as 42 to which may be suitably secured, as by silver soldering, the valving unit which comprises the metering pin 44 and the stop disc 46. It is most convenient to provide these two members in a single replaceable unit. At its upper end, valve stem 36 is provided with a hand nut 50 which is preferably attached to the valve stem as by being threaded on and being further provided with a set screw as 52 to secure the same.

In order to guard against leakage incidental to the handling of high pressure fluids which could easily find their way along the threaded portion 38 of the valve stem, a pressure type packing gland is employed, consisting of the two O-rings 54 and 56 which are spaced apart by a ring member preferably of metal as 58 and which member is relieved as at 60 so that a suitable lubricant, as lanolin for instance, may be packed in this opening and thus provide adequate lubrication of the stem for a long period of use. In my preferred construction, the O-rings form a contact fit with valve stem 36 and also a contact fit on their outer periphery with the washers as 63 and 64. This construction it will be observed is one in which exacting tolerances are not required in order to achieve a high-pressure, leak-proof packing gland. A further very desirable characteristic of this arrangement, as illustrated, is the fact that it provides little if any frictional resistance to the turning of valve stem 36, consequently the valve can be adjusted with very light pressure on the operator's part. Normally the twisting action can be supplied by the thumb and forefinger.

It is desired to point out that this packing gland arrangement does not prevent a slight side movement of stem 36, and further it will be understood that the threaded connection at 38, between the valve stem and the valve stem guide, due to normal machine tolerances, permits a slight movement of the stem. This same pattern is carried out by having the gland nut 70 and the lower portion of the valve stem guide 71 relieved sufficiently so that there is no metal contact with the valve stem. This construction then permits a slight movement of the metering pin 44 which together with the possible slight side springing of the long unsupported portions of the valve stem insures that the metering pin will accurately center itself in bore 30 of the valve disc. This centering has been found to be more dependable than any attempt to machine the parts to a very high tolerance in order to insure this alignment.

Figure 6:
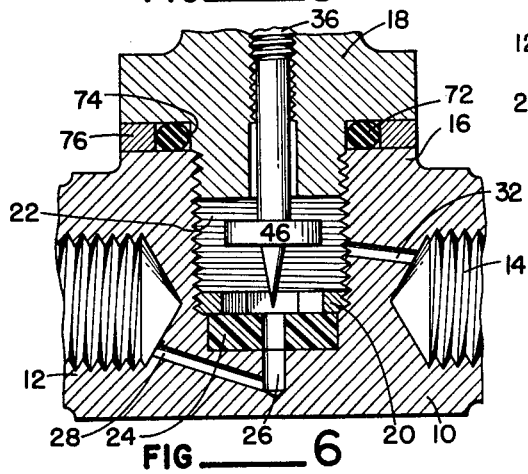
Figure 7:
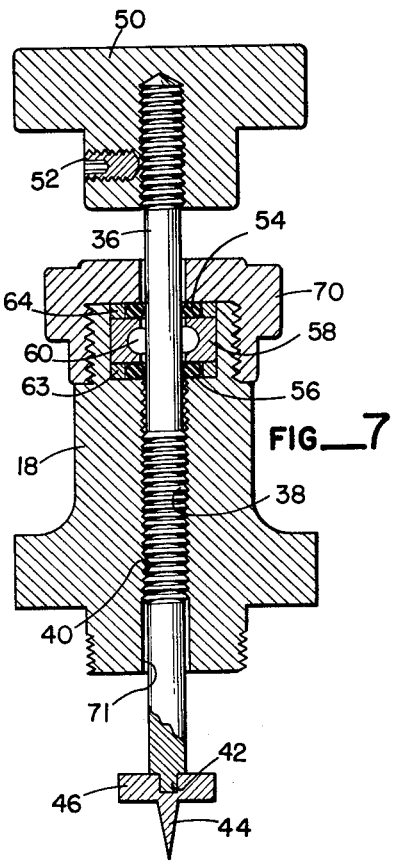
Figure 7 is a vertical sectional view through my valve stem guide and the packing gland for the same.

Valve stem guide 18 is threadedly secured into bore 22 and the juncture between the two members is sealed by O-ring 72. This O-ring is normally positioned in contact with the cylindrical portion 74 of valve stem guide 18 and is supported against outward movement by an annular ring or washer 76. This washer, after a showing of Figures 3 to 6 inclusive, forms a limit for the distortion of the O-ring. A washer of this order can easily be produced to a given thickness, thus the seating of the O-ring in this position and in the stem gland arrangement shown best in Figure 7 is such that the exact seating is achieved without the need of close tolerances, and this assists in producing an accurate high pressure valve at a minimum manufacturing cost.

Reviewing the operation of this valve, it will be noted that in Figure 4 the valve is closed and any attempt to force the metering pin 44 down into the bore 30 of the valve disc 24 is prevented by the stop disc 46 coming into a surface contact with the upper surface of the plastic disc 24. By having the flat surfaces in contact of sufficient area, substantially after the proportions illustrated throughout the drawings, it becomes impossible for an operator to apply sufficient torque to hand nut 50 so that he may damage the actual valving means itself.

Figure 5:
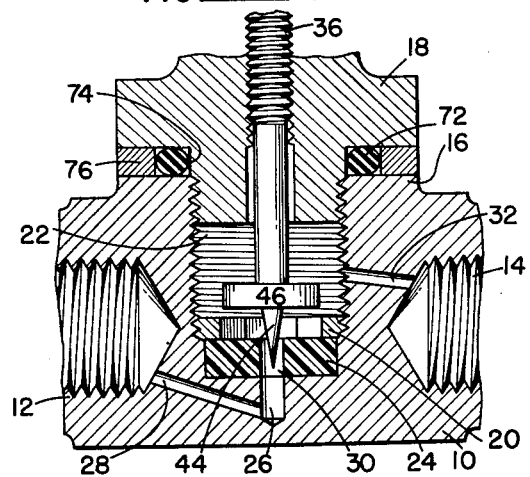
Figure 8:
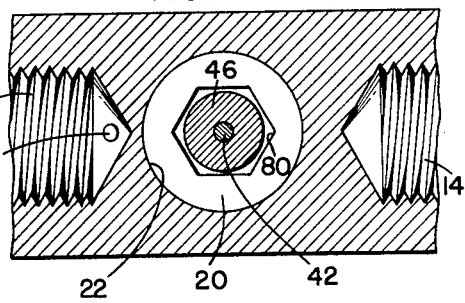
Figure 8 is a horizontal sectional view taken along the line 8—8 of Figure 3.

Thus the valving mechanism is protected against the individual who feels that he must apply extra pressure on a valve in order to be sure that the same is tightly closed. Figure 5 illustrates a partially opened position of the valving means with the metering pin raised so as to give approximately one-half of the maximum flow through the valve disc. Assuming that the flow is from the pipe connecetd to boss 14 to a pipe connected to boss 12, fluid then flows through the connecting passageway 32 and fills chamber 22. It then passes down around the stop disc 46, and in the nearly shut-off positions, this flow will be in the passageway shown in Figure 8 and this is made possible through the construction wherein stop disc 46, which is round, is encircled by the hexagonal interior opening or bore 80 of nut 20. During the initial stages of opening or closing, or the final stages of closing the valve, this provides adequate passageway for the fluid. In Figure 6, the full open position of the valve is indicated where the metering pin 44 is entirely withdrawn from bore 30 and the maximum flow is provided out through counterbore 26 and passageway 28 into boss 12.

It is believed important in the satisfactory operation of this valve to provide that the valve disc 24 be made out of a somewhat resilient plastic or similar material. A suitable material has been found in a plastic sold to the trade under the trade name of "Teflon" and which is representative of the general class of plastic material known as polytetrafluoroethylene resin. This material has a slight tendency to cold flow under pressure, a property which materially assists in sealing against high fluid pressures. Consequently it will seal the circular bore in which is a snug fit and it will come to a perfect bearing, as under the stop disc 46, and may be slightly distortable should the metering pin 44 not be accurately aligned axially with it. These characteristics have proven very desirable in use.

It is believed that the various objects of this invention have been attained with this present structure as this new valve retains its effortless control by having its metering seat completely protected from high pressures developed by torque supplied by the operator by means of the large protective seat where stop disc 46 rests upon the valve disc 24. This seat is at right angles to the female metering means, and, as the plastic material used in the valve disc has a slight resiliency under pressure, it tends to form itself slightly to the shape of a mold when left under pressure. The male metal metering pin and stop disc 46 complete the mold for the female plastic means. This keeps the plastic seat in just the proper shape and is important because it keeps it from becoming distorted from use and thus the valve maintains its perfect control of even very high pressure fluids.

The plastic seat of course is readily replaceable as is the valve stop disc and metering pin and these parts are readily interchangeable because there are no critical tolerances, and no specially fitted surfaces need be used in the device. The design of the metering pin may be easily changed to meet any flow characteristics desired.

It is believed that it will be clearly apparent from the above description and the disclosure in the drawings that the invention comprehends a novel construction of a high pressure metering valve.

Having thus disclosed the invention, I claim:

1. The improvement in a high pressure metering valve with a valve body having two separated bores for securing pressure lines thereto and having an intermediate bore and a valve stem supported by guide means operable to move axially of said intermediate bore, the improvement, comprising: said intermediate bore having a counterbore of small diameter relative the diameter of said intermediate bore in communication with one of said separated bores for passage of fluid therebetween and said intermediate bore being in communication with the other of said separated bores for passage of fluid therebetween, a resilient plastic valve disc positioned in and fitting the base of said intermediate bore and having an axial opening therethrough of substantially the size of said counterbore, the valve stem having on its inner end a stop disc having a large flat face opposed to a large flat face on said valve disc and having a tapered needle-type metering pin aligned with and of comparable size to said counterbore and opening through said washer, whereby the metering pin is adjustable to control the amount of flow through the valve disc and said valve stop coacts with said resilient valve disc to seal the valve without contact between the valve body and metering pin, the area of abutment between said flat disc face and said flat washer face being substantially larger than the area of said center washer opening and pin and means including the walls of said intermediate bore, said metering pin and said flat disc face substantially confining said washer against distortion from its normal flat faced, disc shaped contour when the valve is tightened.

2. A metering valve for high pressure fluids, comprising: a valve body having two threaded bores for connection to pressure lines and having a third bore with interior threads and a valve stem guide threadedly engaged therein; a valve stem threadedly engaged in a threaded opening in said guide and a handle on the outer end of said valve stem for rotating the same, producing inward and outward movement on the axis of said third bore; a stop disc having a flat under surface, and a tapered needle-type metering pin extending inward from the inner flat face of said stop disc, disposed on the lower end of said valve stem; said third bore having a counterbore of slightly reduced diameter and a disc-shaped resilient plastic valve disc positioned therein, with a center opening approximately as large as said pin, at its maximum diameter, for metering the flow of fluid therethrough and with the flat face of said stop disc disposed to selectively coact with said valve disc to seal the assembly; a valve disc positioning ring having exterior threads to engage the interior threads of the said third bore of said body, the area of abutment between said flat disc face and said flat washer face being substantially larger than the area of said center washer opening and pin; means including the walls of said first counterbore, said metering pin and said flat disc face substantially confining said washer against distortion from its normal flat-faced, disc- shaped contour when the valve is closed; said third bore having a second centered counterbore of small size accommodating said pin without engagement when the valve is closed; a first small passageway extending from said second counterbore to one of said threaded bores and a second passageway extending from said third bore above said counterbore to the other threaded bore.

3. The subject matter of claim 2 in which said valve washer seating and positioning ring has threaded edges engaged in said third bore abutting the margins of the face of said valve disc and having a central opening of size and shape relative said valving disc to provide an area, around said valving disc, larger than the opening through said valve disc.

4. The subject matter of claim 2 in which said valve disc is of a resilient plastic material having a slight tendency of cold flow under pressure of said stop disc and to recover when the pressure is released.

5. The subject matter of claim 2 in which said valve disc consists of a resilient plastic material having a slight tendency of cold flowing under fluid pressure and to recover when the pressure is released.

References Cited in the file of this patent

UNITED STATES PATENTS

| | | |
|---|---|---|
| 75,094 | Whitaker | Mar. 3, 1868 |
| 264,317 | McTighe | Sept. 12, 1882 |
| 605,989 | Bean | June 21, 1898 |
| 968,132 | Coyne | Aug. 23, 1910 |
| 2,232,784 | Hifner | Feb. 25, 1941 |
| 2,278,721 | Jones | Apr. 7, 1942 |
| 2,511,109 | Haskell | June 13, 1950 |
| 2,598,187 | Meyer | May 27, 1952 |
| 2,692,750 | Davis et al. | Oct. 26, 1954 |
| 2,696,967 | Wilson | Dec. 14, 1954 |
| 2,768,643 | Acomb | Oct. 30, 1956 |

FOREIGN PATENTS

| | | |
|---|---|---|
| 2,462 | Great Britain | Sept. 19, 1871 |
| 76,463 | Germany | Oct. 11, 1893 |
| 378,947 | France | Aug. 26, 1907 |

OTHER REFERENCES

Article titled "Polytetra Fluoroethylene," Chemical Age Magazine, Jan. 1, 1949, pp. 10–14 (page 12 relied upon).